Aug. 25, 1942.          A. G. F. WALLGREN            2,294,105
                    LUBRICANT SEAL FOR BEARINGS
                      Filed April 27, 1939          2 Sheets-Sheet 2

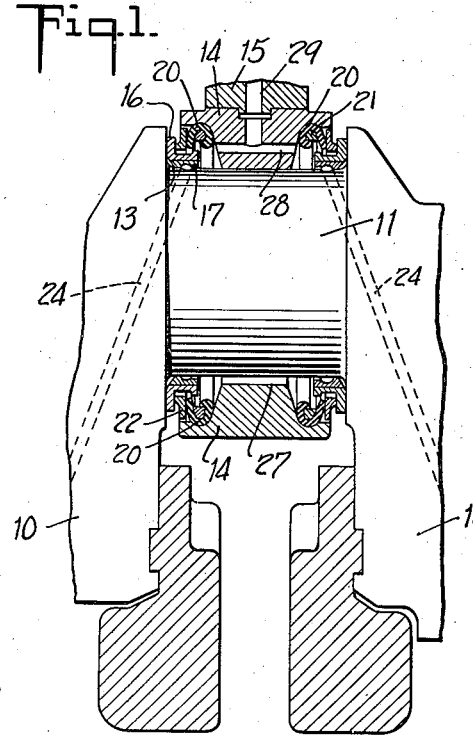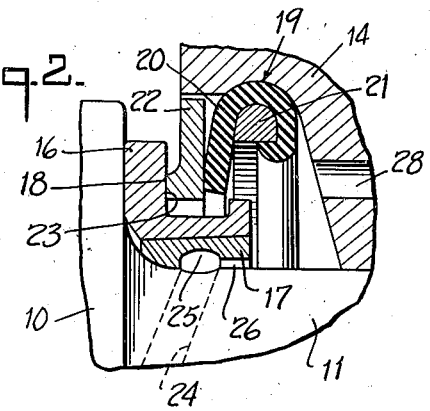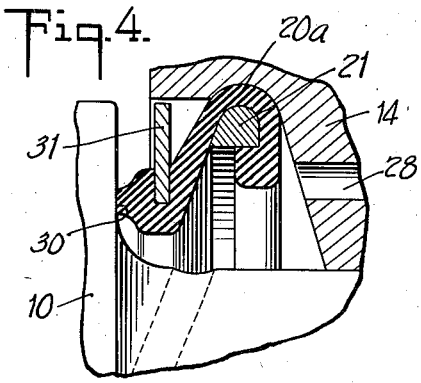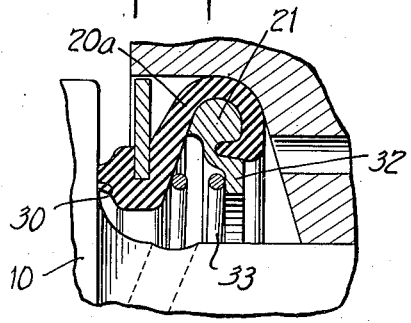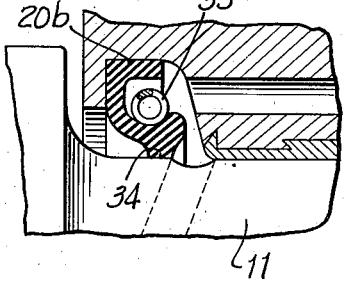

INVENTOR
August Gunnar Ferdinand Wallgren
BY
his ATTORNEY

Patented Aug. 25, 1942

2,294,105

UNITED STATES PATENT OFFICE 2,294,105

LUBRICANT SEAL FOR BEARINGS

August Gunnar Ferdinand Wallgren, Eskilstuna, Sweden, assignor to Aktiebolaget Bolinder-Munktell, Eskilstuna, Sweden, a corporation of Sweden Application April 27, 1939, Serial No. 270,303
In Sweden April 30, 1938

11 Claims. (Cl. 308—36.1)

My invention relates to lubricant seals for bearings and more particularly to a lubricant seal for use in combination with a bearing wherein the diameter of the shaft immediately adjacent to the bearing is of greater diameter than the bearing itself, as in the case in a crankshaft for an internal combustion engine. Heretofore it has been impractical to provide a lubricant seal for the main bearings and connecting rod bearings of a crankshaft, due not only to the lack of space, but also due to the fact that it is impossible to place the parts forming the lubricant seal in their proper location because a ring or the like having the proper diameter cannot be passed over the webs of the crankshaft.

Particularly in a two-cycle engine, it is of great advantage to provide a lubricant seal for the crankshaft bearings. In engines of this type the fuel charge is compressed in the crank case before being admitted to the cylinders. With forced feed lubrication, oil is sprayed from the bearings and thus is mixed with the fuel charge in the crank case and carried along therewith into the cylinders. This not only entails a loss of lubricant, but this oil burns in the cylinders forming smoke and carbon. Moreover, this oil constitutes an extra and unregulated supply of fuel which has an uncontrolled effect on the speed of the engine. Furthermore, the air drawn into the crank case to form the fuel charge often carries dust with it, which dust is removed from the air by the oil spray from the bearings and thus contaminates the oil in the crank case.

Accordingly, it is an object of the present invention to provide a lubricant seal the parts of which may be placed in the small space available at the ends of the bearings, and which may be passed over the crank webs.

Further objects and advantages of my invention will be apparent from the following description considered in connection with the accompanying drawings which form a part of this specification and of which:

Fig. 1 is a cross-sectional view showing my improved lubricant seal applied to a connecting rod bearing of a crankshaft;

Fig. 2 shows a portion of the device illustrated in Fig. 1, but on a larger scale;

Fig. 3 is a view on an enlarged scale of a sealing ring shown in Figs. 1 and 2;

Figs. 4, 5 and 6 are views similar to Fig. 2, but showing other embodiments of my invention;

Figure 7:
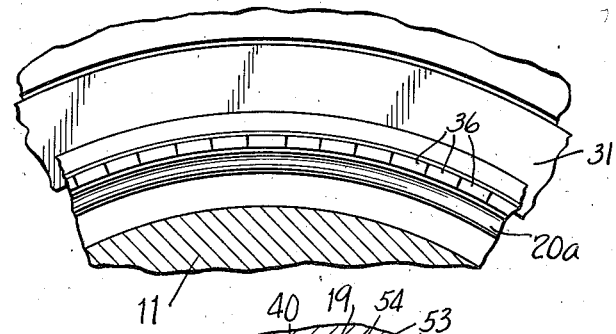
Fig. 7 is an end view of a modification of one of the elements shown in other figures.

Referring more particularly to Figs. 1 and 2, reference character 10 designates webs of a crankshaft which are joined together by means of a crank pin 11. Fillets 13 are provided at the juncture between webs 10 and pin 11 in order to relieve concentration of stress at these points. Rotatably mounted on pin 11 is a bearing member 14, preferably made in two parts and bolted together and to which is secured the crank end of a connecting rod 15. The surface of pin 11 and the inner surface of bearing member 14 constitute the sliding surfaces of the bearing.

A sealing ring 16 is held in place against the cheek of web 10 by means of a tapered locking ring 17. Sealing ring 16 is preferably in one piece and may be made by either welding two semi-circular halves together, or the ring may be machined from the material of the crankshaft and completely separated therefrom. Ring 16 is formed with a machined sealing surface 18. The locking ring 17 is preferably made in two parts which are driven between the pin 11 and the ring 16 to lock the latter in place.

Bearing member 14 is formed with an annular groove 19 within which is received a flexible and elastic sealing member 20. This member must be made of material which is sufficiently resilient to permit sufficient elongation thereof so that the member may be passed over the web 10. Also, the elasticity of the material must be such that, after this elongation, it will return to substantially its original shape. Furthermore, the material must not be attacked by lubricating oil. I have found that synthetic rubber fulfills all of these requirements.

The outer diameter of sealing member 20 when in unstressed condition is such that, when it is confined within the groove 19, it is somewhat compressed, wherefore it bears against the bottom of the groove. A split resilient ring 21 is placed within the sealing member 20, the dimensions of ring 21 in unstressed condition being such as to further press the member 20 into the groove 19 so as to form a fluid tight seal between the member 20 and the bearing member 14. Due to the fact that the ring 21 is split, its ends may be separated to permit placing it around the crank pin 11.

A split annular disk 22, formed with a sealing surface 23 is located between sealing ring 16 and sealing member 20. Member 20 bears against disk 22 so as to form an oil tight seal therebetween and forces the surface 23 of member 22 into contact with the surface 18 of ring 16. Due to the greater friction existing between members 20 and 22, than between surfaces 23 and 18, the member 22 will remain rotationally stationary with respect to the member 20 and the bearing member 14 and hence will rotate with these members and will rotate relative to sealing ring 16. The resilient nature of disk 22 and member 20 permits the surface 23 on the disk to be self-aligning with respect to the surface 18 on the sealing ring 16 and hence the surfaces 18 and 23 remain at all times in close contact with each other. If desired, the disk 22 may be loosely keyed to the bearing member 14 in order to assure that it rotates with this member, while still being free to shift axially with respect thereto in order that the contact between surfaces 23 and 18 may be maintained.

Lubricant under pressure is supplied through bores 24 formed in the crankshaft, which bores terminate within annular grooves 25 formed in locking rings 17. These bores communicate through axial passages 26 with the space formed at either end of the bearing and within members 16, 20 and 22 which form the lubricant seal. If desired, the bearing member 14 may be formed with lubricant grooves 27 to assure an adequate supply of lubricant to the bearing surfaces. Also, passages 28 and 29 are preferably formed in the bearing member 14 and connecting rod 15 for supplying lubricant to the usual wrist pin bearings at the piston end of the connecting rod.

The lubricant under pressure supplied through the passages 24 acts upon the inner surfaces of members 20 and 22 and thus forces the sealing surface 23 into contact with the sealing surface 18 on the ring 16. The greater the pressure of the lubricant, the greater is its tendency to escape between these sealing surfaces. However, this increased pressure also increases the force with which the sealing surfaces are held in contact, thus overcoming the tendency for leakage.

In order to assure that no leakage takes place at the juncture of the ends of the split annular disk 22, this juncture is preferably formed in the manner illustrated in Fig. 3. The thickness of the disk 22 is increased adjacent to the juncture and the ends are formed with corresponding curved projections and curved recesses. Thus, the joint between the ends is of considerable length. Moreover, the curvature of the joint avoids sharp corners which might be chipped off in assembly. The enlargement of the disk takes place gradually in order that the sealing member 20 may closely contact the disk around its entire circumference.

In the embodiment shown in Fig. 4, the sealing member 20a is so formed as to have a sealing surface 30 which is held in sliding engagement with the cheek of the web 10. A split ring 31 is received within an outer groove formed in the member 20a, the ring 31 thus serving to brace this portion of the sealing member 20a. The sealing member is so dimensioned that the surface 30 thereof bears against the cheek of the web 10 and the pressure of the lubricant supplied to the bearing increases the force with which the sealing member contacts the cheek.

In the embodiment illustrated in Fig. 5, the split ring 21 is formed with an inwardly extending portion 32 which serves to support one end of a coil spring 33, the other end of which bears against the sealing member 20a. The purpose of the spring 33 is to increase the force with which the member 20a bears against the cheek of the web 10.

In the embodiment illustrated in Fig. 6, a sealing member 20b is provided and is formed with a sealing surface 34 which bears against a crank pin 11 to provide an oil tight seal. A spiral spring 35 is received within an annular recess formed in the member 20b and serves to force the surface 34 thereof against the crank pin.

In order to reduce the friction between the sealing surfaces 30 and 34 of the sealing members 20a and 20b, respectively, metallic elements 36 may be imbedded in the sealing members at the surfaces, as is shown in Fig. 7. These elements are so arranged in the elastic members 20a or 20b that, when the members are installed, the elements are in close contact with each other, thus preventing leakage of lubricant between the elements. However, during assembly the members 20a or 20b may be stretched so as to pass over the crank webs inasmuch as the elements 36 are not connected to each other, but may be separated as the resilient material is stretched. However, when the material of the members 20a or 20b returns to its normal shape, the ends of these elements are brought into close contact to prevent the escape of lubricant therebetween.

Figure 8:
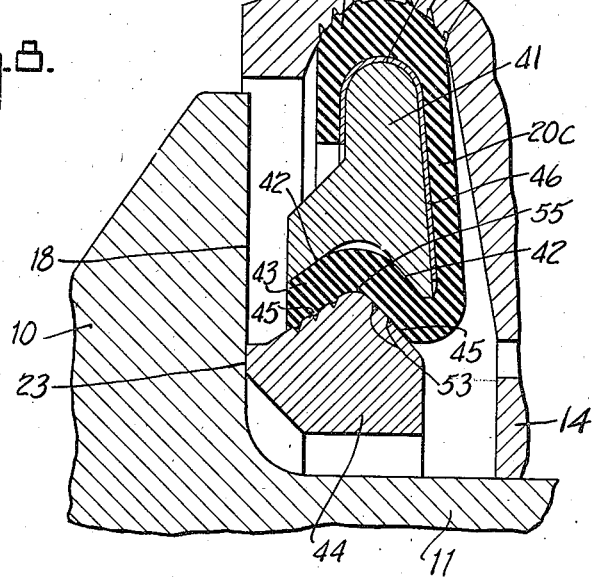
Fig. 8 is a view similar to Fig. 2 but showing a still further embodiment of my invention.
Figure 9:
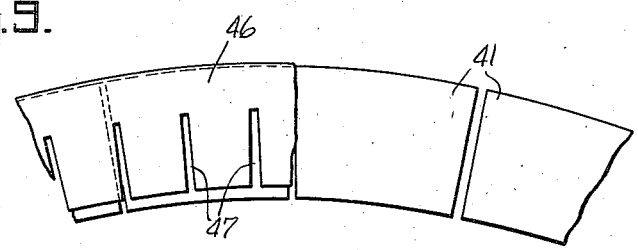
Fig. 9 is a side view on a decreased scale of a portion of a spring plate and of segments illustrated in Fig. 8.
Figure 10:
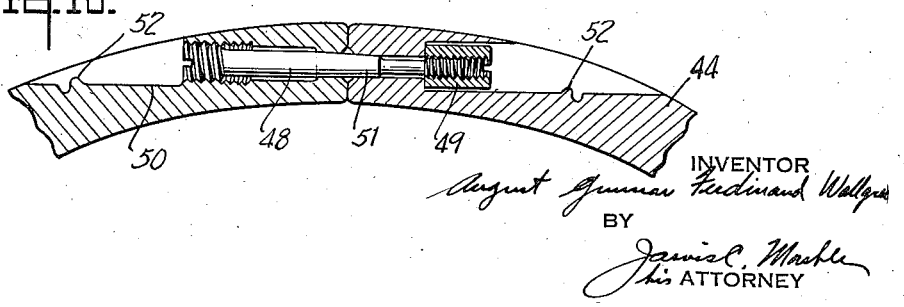
Fig. 10 shows a cross-sectional view on a decreased scale of a portion of a ring taken on the line X—X of Fig. 8.

In the embodiment illustrated in Figs. 8-10, the sealing member 20c is provided with an outer portion 40 which is bent over the radially outer surface of a number of segments 41 arranged around the shaft. The radially inner portion of said segments is recessed and has two surfaces 42 preferably extending at an acute angle to one another, and bearing against an inner portion 43 of the sealing member 20c. Radially inside the portion 43 there is a ring 44 made in two halves. The outer periphery of the ring 44 has two surfaces 45 extending at an acute angle to one another.

Between the segments 41 and the sealing member 20c a spring plate 46 made in two halves is disposed which is adapted to press the ring 44 against the cheek of the web 10. The inner portion of the resilient plate 46 has radial slots 47 (Fig. 9).

The halves of the ring member 44 are interconnected by means of a bolt 48 and a sleeve nut 49 which are provided in a tangentially extending bore 50. The bolt 48 has a tapered portion 51 engaging a bore of corresponding shape at the joint between the halves of the ring 44. When tightening the sleeve nut 49, the proper position of the ring halves is secured so as to form a plane sealing surface 23 which is rotatable relatively to the surface 18 of the cheek of the web 10. In the bore 50, material may be displaced from the wall thereof as indicated at 52 in Fig. 10 in order to prevent that the bolt 48 and the nut 49 can be removed from the ring halves.

The dimensions of the members 44, 20c and 41 are such as to provide certain compression of the portions 40 and 43 of the rubber member 20c in radial direction when in assembled position. The ring member 44 is then axially movable relatively to the bearing member 14 while the various members of the sealing device are rigid in radial direction. Preferably, the recess 19 and the surfaces 45 are provided with small annular grooves as indicated at 53, in which the rubber enters. A tight connection between the sealing member 20c and the members 14 and 44 is then secured even if the elasticity of the rubber should be decreased after a time of use. The top point 54 of the segments 41 is spaced axially at a greater distance from the surface 18 than the top point 55 of the ring 44 so as to be sure that any radial pressure on the ring 44 from the member 20c tends to press the ring 44 against the surface 18 and not away therefrom.

While I have shown several more or less specific embodiments of my invention, it is understood that this has been done for purposes of illustration only and that the scope of my invention is not to be limited thereby, but is to be determined by the appended claims.

What is claimed is:

1. A bearing sealing device for use with a machine embodying a crankshaft member having a crank web and a crank pin connected thereto, and a bearing member journaled on said pin, said member and said pin having cooperating bearing surfaces; said sealing device including a one piece elastic sealing ring carried by one of said members for effecting a fluid tight seal between said one member and the other of said members, said ring having sufficient elasticity to permit it to pass over said crank web.

2. A bearing sealing device for use with a machine embodying a crankshaft member having a crank web and a crank pin connected thereto, and a bearing member journaled on said pin, said member and said pin having cooperating bearing surfaces; said sealing device including a one piece elastic sealing ring having a portion held in fixed relation to one of said members and having a deformable portion to effect a fluid tight seal between said one member and the other of said members, said ring having sufficient elasticity to permit it to pass over said crank web.

3. A bearing sealing device for use with a machine embodying a crankshaft member having a crank web and a crank pin connected thereto, and a bearing member journaled on said pin, said member and said pin having cooperating bearing surfaces; said sealing device including a one piece elastic sealing ring, and a resilient ring for holding a portion of said sealing ring in fixed relation to one of said members, said sealing ring having sufficient elasticity to permit it to pass over said crank web and having a deformable portion for effecting a fluid tight seal between said one member and the other of said members.

4. A bearing sealing device for use with a machine embodying a crankshaft member having a crank web and a crank pin connected thereto, and a bearing member journaled on said pin, said member and said pin having cooperating bearing surfaces; said sealing device including a one piece elastic sealing ring having a portion held in fixed relation to one of said members, and a deformable element having a self aligning surface for slidable engagement with the other of said members, said sealing ring bearing against said element to hold the latter in engagement with the other of said members.

5. A bearing sealing device for use with a machine embodying a crankshaft member having a crank web and a crank pin connected thereto, and a bearing member journaled on said pin, said member and said pin having cooperating bearing surfaces; said sealing device including a one piece elastic sealing ring having a portion held in fixed relation to one of said members, and a deformable split annular element having a self aligning surface for slidably engaging the other of said members, the joint between the ends of said element being curved, said sealing ring bearing against said element to hold the latter in engagement with the other of said elements.

6. A bearing sealing device for use with a machine embodying a crankshaft member having a crank web and a crank pin connected thereto, and a bearing member journaled on said pin, said member and said pin having cooperating bearing surfaces; said sealing device including a one piece elastic sealing ring having a portion held in fixed relation to one of said members, and a deformable split annular element having a self aligning surface for slidably engaging the other of said members, the ends of said element being thicker than the remainder and formed with complementary curved projections and recesses to thereby provide an elongated curved joint, said sealing ring bearing against said element to hold the latter in engagement with the other of said elements.

7. A bearing sealing device for use with a machine embodying a crankshaft member having a crank web and a crank pin connected thereto, and a bearing member journaled on said pin, said member and said pin having cooperating bearing surfaces; said sealing device including a one piece elastic sealing ring carried by one of said members and being provided with a self-aligning surface slidably contacting the other of said members to effect an oil tight seal, said ring having sufficient elasticity to permit it to pass over said crank web.

8. A bearing sealing device for use with a machine embodying a crankshaft member having a crank web and a crank pin connected thereto, and a bearing member journaled on said pin, said member and said pin having cooperating bearing surfaces; said sealing device including a one piece elastic sealing ring carried by one of said members, and a plurality of separate abutting metallic elements carried by said ring to provide a self-aligning surface slidably contacting the other of said members to effect an oil tight seal, said ring having sufficient elasticity to permit it to pass over said crank web, said elements separating from each other as the ring is stretched.

9. A bearing sealing device for use with a machine embodying a crankshaft member having a crank web and a crank pin connected thereto, and a bearing member journaled on said pin, said member and said pin having cooperating bearing surfaces; said sealing device including a one piece elastic sealing ring having a portion held in fixed relation to one of said members and having a deformable portion to effect a fluid tight seal between said one member and the other of said members and a split ring encircling said deformable portion for the purpose of bracing the latter.

10. A bearing sealing device for use with a machine embodying a crankshaft member having a crank web and a crank pin connected thereto, and a bearing member journaled on said pin, said member and said pin having cooperating bearing surfaces; said sealing device including a one piece elastic sealing ring having a portion held in fixed relation to one of said members and having a deformable portion to effect a fluid tight seal between said one member and the other of said members, and spring means for urging said deformable portion toward said other member, said ring having sufficient elasticity to permit it to pass over said crank web.

11. In a bearing sealing device for use with a bearing having an inner bearing element and an outer bearing element, said sealing device including a sealing ring of rigid material having a sealing surface cooperating with a radial sealing surface formed on one of said elements, an elastically deformable ring of non-metallic material between said sealing ring and the other bearing element, and a plurality of peripherially spaced segments imparting rigidity in radial direction to said deformable ring while permitting displacement in axial direction.

AUGUST GUNNAR FERDINAND WALLGREN.